United States Patent Office 3,278,322
Patented Oct. 11, 1966

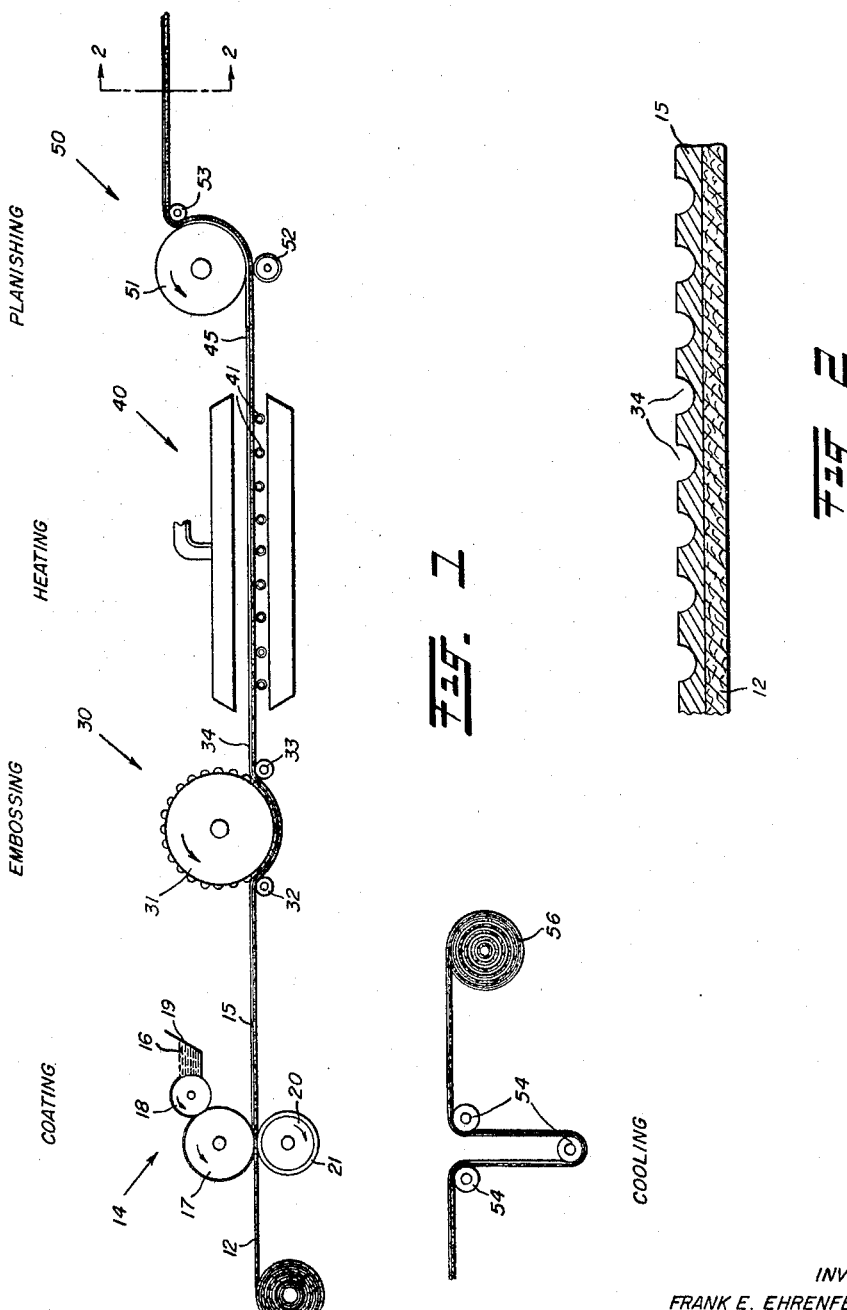

3,278,322
PROCESS FOR PRODUCING A DECORATIVE
SURFACE COVERING
Joseph C. Harkins, Jr., Kennett Square, and Frank E. Ehrenfeld, Jr., Brookhaven, Pa., assignors to Congoleum-Nairn Inc., Kearny, N.J., a corporation of New York
Filed Nov. 30, 1962, Ser. No. 241,197
12 Claims. (Cl. 117—10)

This invention relates to surface coverings and in particular to decorative surface coverings having a base and a wear-resistant surface layer applied as a coating for use on floors, walls and the like.

Decorative surface coverings having a base are well-known in the art. It has been conventional practice to impregnate a felted fibrous sheet with a bituminous material or other resinous impregnant and to apply to the surface of the felt an oleoresinous seal coat to act as a barrier to prevent the impregnant from staining the subsequently applied decorative layer. This decorative layer has, in the past, been an enamel paint which is applied using a flat bed printing machine. In this type of product, the decorative coating also provides the wear-resistant layer. Alternately, a decoration can be applied to the seal coated felt with a printing ink using one of the rotary graphic art printing processes, such as rotogravure, offset printing, lithography and the like. This thin ink layer is then protected by a subsequently applied clear wear layer. This clear wear layer comprises an oleoresinous varnish, an alkyd resin, a urea-melamine, alkyd resin or similar material.

Although such products are inexpensive to produce, their service life is comparatively short. More recently, the quality of such products has been improved by providing as a clear top or wear layer a resinous material of greater hardness and wear resistance than the conventional resins and varnishes which have been used in the past. A typical example of such an improved material is a vinyl resin. Vinyl resins have known properties of abrasion resistance and resistance to chemicals which make them especially valuable and useful in providing the wear resistant and/or decorative layer for a felt base floor covering.

In the preparation of printed surface coverings having a vinyl composition wear surface layer, the vinyl composition is applied to the printed sheet in the form of an organosol, a plastisol or a latex of a vinyl resin. The sheet is then subjected to high temperatures in the order of 300° F. to 375° F. in order to fuse the vinyl resin. In the process of fusion, the resin becomes solvated by the plasticizer present in the vinyl composition to yield a clear, tough vinyl wear surface layer with a high degree of strength and resistance to abrasion. In the production of printed surface coverings having a vinyl composition wear surface layer, the fusion process is most commonly carried out by passing the sheet through a long oven of either the forced hot air or radiant heating type.

Many of the resinous composition surface coverings available on the market have been treated by embossing the surface to give the product a textured or three-dimensional appearance. Embossing is a very desirable technique for decorating surface coverings since elaborate types of design and multi-colored decorations can be produced by making use of the valley printing technique which involves the simultaneous printing and embossing. This embossing is carried out by heating the wear layer of the sheet and contacting the heated layer with an engraved embossing roll. Most of the printed floor covering produced is twelve feet in width. The preparation of engraved rolls for embossing such a wide sheet is very costly. This is due not only to the expense in engraving, but also the construction of the roll. The roll must be of substantial structural strength since it has to have minimum deflection and also must withstand the high pressures required to reproduce the engraved design on the surface covering. Provision must also be made to rapidly cool the heated sheet to fix the embossed design. The high pressures and temperatures required are also detrimental to the resilient-covered back-up roll necessitating frequent replacing.

It is an object of the invention to provide a simple and economic process for producing a surface covering having a resinous composition wear layer with an embossed decoration. Another object of the invention is to provide such a process which eliminates the necessity for expensive embossing rolls. A further object of the invention is to provide such a process readily adaptable to conventional processing equipment. Other objects and the advantages of the invention will appear hereinafter.

In accordance with the invention, a decorative surface covering having an embossed resinous composition wear layer is produced by applying a thin liquid resinous composition film to the surface of a backing sheet, deforming the liquid film to correspond to a desired pattern and immediately heating the coating to fuse the composition and thereby fix the design in the surface of the fused composition. The sheet can then be planished to increase the gloss, if desired. The process of the invention has several advantages. Little pressure is required to deform the liquid film since its resistance to deformation is very slight. The deforming roll itself can be of simple construction and substantially less expensive than conventional embossing rolls. It is unnecessary to use a back-up roll for the deforming roll thusly further reducing the equipment required. It is also unnecessary to heat the surface of the sheet prior to deforming.

The invention will be better understood from the following detailed description when read in conjunction with the accompanying drawings wherein:

FIGURE 1 is a schematic representation of apparatus for carrying out one embodiment of the invention, and FIGURE 2 is a cross-section of the backing after coating with a wear resistant composition and deforming the coating.

Referring to FIGURE 1, a backing, such as a felted fibrous sheet 12, is fed from a supply roll 13 and is passed through a roll-coater, generally indicated at 14. A coating 15 of liquid resinous composition 16 is applied to the surface of the felt 12 from a coating roll 17. The composition is placed on the roll 17 by means of a smaller roll 18 which is in contact with a trough 19 of the resinous composition 16. The sheet is pressed against the coating roll by a pressure roll 20 having a resilient covering 21. The coated sheet is then passed to an embossing apparatus, generally indicated at 30, comprising a steel roll 31 having a suitable design in its surface. Spaced carrier rolls 32 and 33 hold the sheet in contact with the embossing roll. Little pressure is required to cause the design 34 to be impressed into the liquid resinous composition layer 15. As an illustration the pressure exerted on the sheet can be as little as 10 pounds per linear inch as contrasted with the normal required pressure of over 400 pounds per linear inch when embossing a fused vinyl film. The sheet is then immediately passed through a heating chamber, generally indicated at 40, such as a hot air oven or a bank of infrared heat lamps, in which it is supported by means of spacer rolls 41. The oven is heated to a sufficiently high temperature to cause the complete fusion and solvation of the resinous composition thereof fixing the embossing in the sheet. The sheet emerging from the oven bears an upper layer 45 of fused resinous composition. The product can be passed through a planishing unit, generally indicated at 50, comprising a highly polished chrome roll 51 and a resilient-covered back-up roll 52. The sheet is allowed to be carried on the surface of the polished roll without any pressure on the sheet and then removed by take-off roll 53. Careful control must be exercised in this operation to prevent loss of the embossing. The product is thereafter cooled by passing over cooling rolls 54. The cooled sheet is then wound on a collecting roll 56.

The base upon which the coating is applied is most frequently a web of felted fibers. The base, however, can be a sheet of thermoplastic composition or a woven fabric. The felt generally is produced using a Fourdrinier or cylinder paper machine with the thickness of the resulting sheet being that usually used in floor and wall coverings, that is, from 0.02 to 0.08 inch. The fibrous material used is normally cellulosic in origin, although other fibers can be used including those of animal and mineral origin. The sources of cellulosic material can include cotton or other rag material, wood pulp, including both ground wood and chemical wood pulp, paper, boxes, or mixtures thereof in any proportion. The web can also contain fillers, such as wood flour.

It is preferable to use a felt impregnated with a resinous material as the backing for added strength and water resistance. The particular impregnant selected is not critical to the invention, although it must be used in sufficient quantities to hold the fibers of the sheet together in a unitary form and resist delamination. The impregnant should be compatible with adhesives so that after installation, there will be no adverse migration of impregnant to adhesive. It is also necessary for the impregnants to be sufficiently stable to withstand the high temperatures encountered during processing of the surface covering. It should be free from any volatile components and also must not soften to such an extent as to extrude from the sheet. In addition, the impregnant should not be subjected to any detrimental chemical changes at high temperature. Fibrous sheets impregnated with thermoplastic resinous materials are particularly suitable for use as backing sheets in the invention. Suitable resins include vinyl resins such as polyvinyl chloride, polyvinyl acetate, polymerized vinylidene chloride, mixtures of these with each other, copolymerized with each other and with other monomers copolymerizable therewith. Polymerized acrylic and methacrylic acids and their polymerized derivatives are particularly suitable. In addition, resinous substances such as polyethylene, polystyrene, elastomers, such as butadiene styrene, butadiene acrylonitrile, polymerized chloroprene, natural rubber and the like. In addition, other thermoplastic resins and thermosetting resins can be used which, under the influence of heat, cure by polymerization and cross-linking. Such resins as phenolic resisn, polyesters, oleoresins, as for example, drying oils, isocyanates, polyurethanes, hydrocarbon resins, such as asphalts and similar materials are suitable. The impregnants are conventionally added to the felt sheet by passing the finished sheet through an emulsion, solution or melt of the resin and subsequently drying and/or curing the resin. Alternately, the resin can be added during the formation of the felt by dispersing or dissolving the resin in the fiber furnish.

The density of the fibrous sheet useful as a backing for a surface covering is lower than that of paper. The physical characteristics of a sheet of this type are commonly defined by the ratio of the thickness of the sheet to the weight of a specified area. This ratio is often referred to as the gauge to weight ratio. It is preferred that the fibrous sheet used as a backing according to the invention have a gauge to weight ratio in excess of 0.8 as defined by the formula:

$$\frac{\text{Thickness of felt (thousandths of an inch)}}{\text{Weight of 480 sq. ft. of dry sheet (pounds)}}$$

A particularly effective range of gauge to weight ratios is from about 0.8 to about 1.2. These values are to be contrasted with the gauge to weight ratio of paper which is normally about 0.4 and rarely reaches 0.8. The thickness of the felt can vary widely but it is preferred between about 20 to about 50 mils in thickness.

The fibrous base may have one or more thin coatings which serve as seal coats to prevent the bleeding of the impregnant into the wear resistant composition layer, to help bond the wear layer to the felt backing, or serve as a background color if a design is to be printed on the surface of the backing for use with a transparent, translucent, or partially transparent wear layer. The thinness of such coatings can vary but usually are in order of one to three mils in thickness. It is sometimes desirable to use multiple coatings in order to obtain optimum adhesive characteristics between the various component layers. The seal and/or base coats are preferably applied in the form of an aqueous emulsion of resinous binder and filler. In the preparation of the seal coats, the resinous binder and filler are emulsified in water in the presence of conventional wetting agents, thickening agents, anti-foam agents, sequestering agents and the like. After the application of each seal coat to the fibrous backing sheet, the coating is dried by subjecting the sheet to heat, as for example, in the range of about 100° F. to about 150° F. for about 30 minutes to about 2 hours. Alternatively, drying can be effected by exposing the coated sheet after the application of each seal coat to a temperature of about 300° F. to about 400° F. for one to five minutes.

As indicated above, the seal coat is preferably applied in the form of an aqueous dispersion. Many vinyl resins suitable as an ingredient in the seal coat are commercially available in the form of an aqueous dispersion containing from 40 to 50 percent solids. These dispersions also contain wetting agents, antifoaming agents and sequestering agents. Suitable wetting agents include the sodium sale of polymerized alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable anti-foam agents are pine oil, silicone, diglycol laurate, and octyl alcohol. Suitable sequestering agents include tetrasodium pyrophosphate and the tetrasodium salt of ethylenediamine tetra-acetic acid. Alkali is usually present to provide pH of above 7.0 so that there will be no tendency for the latex to coagulate. Calcium hydroxide, sodium hydroxide, ammonia, and potassium hydroxide are suitable alkalis for this purpose.

Normally, the pigments and fillers are ground with water in the presence of wetting agents, thickening agents and the like and the pigment dispersion is mixed with the vinyl resin and plasticizer later. Alternately, the seal coat can be effectively applied in the form of a solution using, for example, a solvent such as toluene or methyl ethyl ketone. The cost of using solvents, however, and the fire and health hazards created by their use render the method undesirable.

The seal coat can contain stabilizers to retard the decomposition of the vinyl resin and increase the life of the product, such as sulfides and sulfites of aluminum, silver, calcium, cadmium, cerium, sodium, magnesium, strontium; lead and tin stearates; oleates and other complexes; glycerine, leucine, alanine, o- and p-aminobenzoic and sulfanilic acids, hexamethylene tetramine, salts including phosphates, stearates, palmitates, oleates, ricinoleates, abietates, laurates, salicylates; and the like.

The seal coats are characterized by comprising a vinyl resin, that is a polymeric material obtained by polymerizing compounds containing at least one —CH=C radical. Useful vinyl resins include polymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, and the like, and copolymers of the above with other monomers copolymerizable therewith, such as vinyl esters including vinyl bromide, vinyl chloracetate, vinyl alkyl sulfonates, trichloroethylene and the like; vinyl ethers such as vinyl ethyl ethers, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl maleate, dimethyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone, and the like. The monomers listed hereinabove are useful in preparing copolymers with a vinyl resin can be used as modifiers in the polymerization, in which case they may be present in an amount of a few percent, or they can be used in larger quantities, up to as high as 40 percent by weight of the mixture to be polymerized. If desired, a mixture of vinyl resins can be used in preparing coating paints for use in the invention.

A plasticizer for the vinyl resin is also frequently present in the seal coat composition. Suitable plasticizers for the vinyl resin include ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers such as butadiene-styrene copolymer, butadiene-acrylonitrile copolymer and the like, and other materials which function as plasticizers such as epoxidized drying oils, aromatic hydrocarbon condensates and the like. Where certain flexible soft vinyl resins are used in formulating the seal coat, such as polymers containing large proportions of ethyl acrylate, no plasticizer is needed. However, in most instances, a plasticizer is essential in order to impart the necessary properties of flexibility to the dried seal coat film.

Seal coat compositions can contain solid filler. The term "filler" as used herein embraces both coloring pigments such as titanium dioxide, zinc oxide, and the like as well as insert filling materials, such as barium sulfate, calcium sulfate, magnesium carbonate, magnesium silicate, silica, both amorphous and crystalline, whiting, talc, clay, pumice, limestone and the like. The dried seal coat film can contain up to 90 percent by weight of filler.

As described hereinabove, if seal coats are utilized, they would have a total thickness of about 2 to about 12 mils. Thicker coats are used, when necessary, to insure complete covering of all irregularities in the fibrous backing sheet and yield a smooth surface for printing or coating.

The use of multiple coats is particularly effective since the formulations for the individual coatings can be specially designed for the particular requirements of each coating. Thus, the coating applied directly to the fibrous sheet, is designed to provide a high degree of seal against migration of the impregnant. The upper coating, upon which the decorative design is printed, is designed to provide a film to which the vinyl printing inks and/or vinyl wearing surface layer will adhere. An intermediate seal coat can be used to provide a bridge between the first and uppermost coatings, thereby promoting optimum adhesion between the coatings and insuring a high degree of resistance to delamination in the finished product. In addition, where three seal coats are used, the desired total thickness can be obtained using the conventional techniques of coating, such as flexible doctor blade roller application. Several thin coats are also preferred over one thick coat to insure level and smoothness of the coatings and to insure complete drying after their application. Suitable seal coat systems are disclosed, for example, in U.S. Patent No. 3,068,118, issued December 11, 1962 to Biskup, et al., on application Serial No. 177,686, filed January 12, 1962.

If it is desired to print a design on the surface of the felt, this can be accomplished by any of the conventional printing techniques, such as rotogravure, offset printing, lithograph or the like.

The impregnated felt, with or without seal coats or printed designs, is then coated with a resinous wear resistant composition. This layer can be transparent if a printed design or coloration is on the felt or it can be pigmented to any color desired in the finished product. The opaque coating composition comprises a resinous binder, pigment, filler and stabilizers and a liquid dispersion medium. If the coating is to be transparent, the pigment and fillers are usually omitted. The coating composition ratio percent filler to resin binder usually does not exceed one to four or including transparent coating would be in the range of 0 up to about 25 percent pigment filler. Larger amounts of filler can be used but greater the pigment filler, the less wear resistance in the final product.

The resinous binder used in the wear layer composition must be one that can be coalesced, fused or cured into a continuous wear resistant layer by the application of heat. The preferred resinous binder in the coating composition comprises thermoplastic resinous material since such materials are particularly suitable to the production of flexible surface coverings. The thermoplastic resinous binder can be made up solely of thermoplastic resin but it is preferred, in addition, to use a plasticizer.

Useful thermoplastic resins include polymers of vinyl chloride, vinyl acetate and similar vinyl esters, acrylic and methacrylic acids and their lower ethyl derivatives, polystyrene, polymerized methylstyrene, polybutadiene and the like. Polymers of vinyl chloride have been found particularly effective in the formulation of coating emulsions in the invention because of their high wear resistance. The vinyl chloride polymers can either be simple, unmixed homopolymers of vinyl chloride or copolymers, terpolymers or the like in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therein. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives, such as ethyl acrylate, methyl methacrylate, ethyl methacrylate, diethyl maleate, diethyl fumarate and the like; vinylidene compounds on the order of vinylidene chloride; like, unsaturated hydrocarbons, such as ethylene, propylene, isobutene and the like; allyl compounds, such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like.

Elastomeric resins, such as butadiene-styrene copolymer, butadiene-acrylonitrile copolymer, polymerized chloroprene, natural rubber and the like can also be used as resinous binders in the formulation of coatings for use in the invention.

As already discussed, thermoplastic resinous material can be produced which has satisfactory flexibility at normal temperatures without the presence of plasticizer to be useful as the resinous binder in the wear layer coating composition. However, in the case of most of the preferred vinyl chloride polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of 15 to 150 parts of plasticizer per 100 parts of resin.

The wear layer composition can also contain fillers and pigments in accordance with the particular color desired in the finished product. Inert fillers, such as silica, both amorphous and crystalline, whiting, talc, clay, pumice, limestone and the like are suitable. Pigments are selected in accordance with the desired color. For example, where a white is desired, titanium dioxide and zinc oxide either alone or with extenders, such as barium sulfate, calcium sulfate, magnesium carbonate, magnesium silicate and the like, can be used. For colored coatings, any of the well-known organic or inorganic pigments can be used in the coating emulsion. In the production of the coating composition in the form of an emulsion, the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

The wear layer coating composition also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium, and the like, glycerine, leucine, alanine, o- and p-amino benzoic and sulfanilic acids, hexamethylene tetramine, weak acid radicals including oleates, recholeates, abietates, salicylates and the like. Normally, the composition contains from 0.5 to 5 parts stabilizer per 100 parts resin.

When the composition is formulated as an aqueous emulsion, the dispersion is formed in the conventional manner and with conventional ingredients well-known in the latex art. The coating emulsion, in general, contains about 40 to about 65 percent solids with the balance being water. In addition to the resinous binder, pigment, filler and stabilizer, the emulsion contains conventional wetting agents, thickening agents, anti-foam agents, sequestering agents and alkali. Suitable wetting agents include the sodium salt of alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl celluose and the like are satisfactory thickening agents.

The wear layer coating can be applied from other types of liquid compositions. For example, thermoplastic resinous plastisol and organosol coating systems can be used. In this case, the dispersion medium instead of being water is a plasticizer for the resinous binder in the case of a plastisol and a mixture of plasticizer and volatile organic solvent in the case of an organosol. Typical of the solvents which can be used are methyl ethyl ketone, xylene and mineral spirits.

Particularly unusual results can be obtained if small quantities of blowing agents are added to the coating composition. A blowing agent can be selected which decomposes at or below or above fusion temperature of the resinous composition to form a cellular structure in the coating. Typical of suitable blowing agents are complex organic compounds which, when heated, decompose to yield a gas and which have residues which are compatible with the resinous composition. Such materials have the property of decomposition over a narrow temperature range which is particularly desirable to obtain a good foam structure. Compounds having the double bond =N—N= and —N=N— linkages decompose at elevated temperatures to yield an inert gas high in nitrogen. Such compounds include substituted nitroso compounds, substituted hydrazides, substituted azo compounds, and the like, such as p,p'-oxybis-(benzenesulfonyl hydrazide), N,N'-dimethyl - N,N' - dinitroso terephthalamide, dinitroso-pentamethylene-tetramine, and azodiformamide. They are usually present in from 1 percent to about 10 percent by weight of resin. A particularly useful surface covering can be prepared by coating the base with a foamable composition, such as a vinyl composition, followed by heating to gel the composition without decomposing the blowing agent. The composition used can be the same as the liquid coating composition. The coated base is then cooled and the liquid coating composition is applied and embossed as described above. During the subsequent heating, the blowing agent is decomposed to form a cellular structure on the surface of the product. The resulting product has a base, a foam layer on the base, and an embossed solid layer on the surface of the foam layer.

The resinous composition is applied to the backing by any of the conventional techniques well-known in the coating art, such as roll coating, doctor blade coating, spray application, brush application or the like. The coating can be of any thickness from about 0.001 inch but is preferably about 0.002 inch to about 0.020 inch in thickness. The most economical product is obtained, of course, with the thinnest possible coating. The coating composition is preferably highly thixotropic so that the embossing or deformation placed in the liquid film will maintain good fidelity until the coating is fused. As a general rule, a Brookfield viscosity @ 2 r.p.m. of about 4000 cps. to about 20,000 cps. is utilized. Particularly good results have been obtained with the viscosity ranging from 6500 cps. to 10,000 cps. If lower viscosities are utilized, it is essential to pass the sheet into the oven as quickly as possible in order to fuse the coating and maintain the embossing. Brookfield viscosity is determined by rotating a cylinder or disc in a fluid through a beryllium-copper spring. The deflection of the spring is read on a dial. The dial reading is multiplied by a constant to obtain the resulting viscosity at the particular rotational speed.

The embossing or deforming step can be carried out by forcing the desired impression in the liquid coating. The embossing roll is preferably a roll having outwardly extending projections in the form of the design. The height of the raised areas should be substantially greater than obtained in an engraved roll to prevent liquid building between the raised areas which will interfere with the operation. An excellent embossing roll can be prepared by placing brass projections of about one inch in height on a wooden roll in the form of the design desired. As indicated previously, very little pressure is required since the surface being embossed is a liquid film. The depth of embossing can vary but usually a depth of at least 0.001 inch is required for the embossing to be readily discernible. If desired, a printing ink or similar resinous material can be applied to the surface of the embossing roll, so that the color in the embossed areas contrasts with the basic color of the sheet. One of the particularly desirable features of the invention is that a back-up roll is not needed. Spaced rolls can be used for holding the liquid-covered sheet against the embossing surface. Deflections or irregularities of the embossing surface will be readily overcome by the flexibility of the coated sheet.

After the embossing, the sheet is immediately subjected to heat in order to evaporate any volatile components and to set or fuse the resinous binder into a flexible uniform film. The temperature which the coated layer must attain is dependent on the particular resinous binder used. With the preferred thermoplastic resinous binders, the coating is preferably heated to the fusion temperature of the resin, that is, the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° F. to about 375° F. and preferably 275° F. to 350° F. is usually sufficient to yield a uniform film. Heating can be effected by any means, such as passing the sheet through a forced hot air oven or by placing radiant heating elements above the coated surface.

The sheet, after fusion, is preferably passed through a planishing unit comprising a metal surface which engages the fused wear surface layer and a resilient surface which supports the base. The temperatures of the two rolls muts be maintained within carefully controlled limits in order to yield a satisfactory product. When the wear surface layer is formed of a vinyl resinous composition and leaves the fusion oven at a temperature of about 350° F., the metal roll should be maintained at a temperature at least 75° F. below the temperature of the vinyl composition and preferably between about 150° F. and about 230° F. and the resilient surfaced roll should be maintained at a temperature which will not damage the backing material and preferably between about 100° F. and about 175° F. For particularly effective operation, the metal roll should have a temperature between 160° F. and 200° F. and the resilient surfaced roll should have a temperature between 120° F. and 140° F.

The metal roll which contacts the fused layer of wear resisting composition is formed with a smooth polished metal surface preferably of chrome steel. The interior of the roll is provided with a number of passages for passage of heat-regulating fluids to permit close control of the roll temperature. Where a wearing surface layer having a high gloss is not desired in the finished product, the chrome surface of the roll can be provided with a matte finish in order to promote any degree of surface gloss desired in the finished product.

The roll which supports the backing is formed with a resilient surface over a metal core. The resilient surface is formed from rubber or other elastomeric material and the roll provides a cushion to permit uniform contact of the metal roll with the fused surface layer. The rolls are urged together by means of a hydraulic pressure unit or other conventional pressure applying device to maintain a pressure just sufficient to adhere the coating to the chrome surface roll. Care must be exercised to prevent loss of the embossed designs.

Typical wear layer formulations for use in the invention are as follows:

Example I

| | Parts |
|---|---|
| Vinyl chloride-vinyl acetate copolymer | 50 |
| Tricresyl phosphate | 15 |
| Xylene | 40 |

Example II

| | |
|---|---|
| Vinyl chloride polymer | 50 |
| Dioctyl phthalate | 17 |

Example III

| | |
|---|---|
| Vinyl chloride polymer | 80 |
| Dioctyl phthalate | 13 |
| Tricresyl phosphate | 14 |
| Stabilizers | 4 |
| Mineral spirits | 17 |
| Methyl ethyl ketone | 2 |

Typical seal coat formulations are as follows:

Example IV

| | |
|---|---|
| Vinyl chloride polymer latex (50% solids) | 30 |
| Butadiene-acrylonitrile copolymer latex (50% solids) | 30 |
| Sodium alkyl aryl sulfonate | 2 |
| Titanium dioxide | 14 |
| Whiting | 54 |
| Methyl cellulose suspension (7% solids) | 15 |
| Water | 20 |

Example V

| | |
|---|---|
| Vinyl chloride polymer latex (50% solids) | 42 |
| Butadiene-acrylonitrile copolymer latex (50% solids) | 44 |
| Dioctyl phthalate | 7 |
| Sodium alkyl aryl sulfonate (5% dispersion) | 4 |
| Sodium hydroxide solution (25% solids) | 0.4 |
| Titanium dioxide | 25 |
| Whiting | 100 |
| Methyl cellulose dispersion (3.5% solids) | 20 |
| Water | 62 |

Example VI

| | |
|---|---|
| Vinyl chloride-vinyl acetate copolymer latex (50% solids) | 400 |
| Butadiene-styrene copolymer latex (45% solids) | 350 |
| Titanium dioxide | 120 |
| Limestone | 500 |
| Tetrasodium pyrophosphate | 2.5 |
| Resin acid soap | 4 |
| Carboxymethyl cellulose | 4 |
| Water | 350 |

Example VII

A fiber stock made up of a furnish consisting of 46 percent corrugated boxes and 54 percent new cotton cuttings is refined in a Jordan mill and blended in a mixing chest to produce a water slurry containing 2.5 percent solids. An emulsion containing 12 percent solids of polymerized vinyl acetate (having a ASTM Ring and Ball softening point of 395° F.) is added to the mixing chest so that the amount of polymer equaled 8 percent of the dry weight of the fibers. The resin is caused to form agglomerates by the addition of 20 percent aluminum solution to the mixing chest. The resulting mixture is diluted to ½ percent solids and the diluted slurry is formed into a web on a single cylinder paper machine.

The web is dried and passed through a dip tank containing a resinous petroleum fraction as a 40 percent solids solution in petroleum naphtha solvent. The petroleum resinous fraction has the following properties:

| | |
|---|---|
| Form | Semi-solid. |
| Softening point | 79° F. (Ring and Ball Method). |
| Color | 14 (Gardner Color Scale). |
| Density | 0.98 grams/cubic centimeter. |
| Ash content | 0.3 percent. |
| Viscosity | 98 Saybolt-Furol Seconds @ 210° F. |

The web after being passed through squeeze rolls containing 35 percent petroleum resin based on the dry weight of the fibers. The web measures 0.043 inch in thickness and has a gauge to weight ratio based on the weight of resin-free dry fibers of 0.90. The impregnated web is dried on conventional drying cans.

The impregnated felt as prepared is passed through a roll coater which applies a uniform coating on one surface of the felt of approximately 0.005 inch in thickness. The coating was formulated according to Example I and contained approximately 5 percent of green pigment. The coating composition had a Brookfield viscosity at 2 r.p.m. of 8,000 cps. The coated sheet is then passed through embossing apparatus comprising a roll containing one inch metal projections in the form of the design to be placed in the coating. The embossed coated felt was then immediately passed through a hot air oven to raise the temperature of the coating to approximately 375° F. thereby fusing the resin in the coating. Immediately after leaving the fusion oven, the sheet was passed between a polished upper steel roll which contacted the fused polyvinyl chloride wearing surface layer and a rubber-covered lower roll which supported the impregnated felt backing. The pressure between the rolls was 10 pounds per lineal inch of sheet width. The upper roll was maintained at a uniform temperature of 180° F. and the lower roll was maintained at 130° F.

The sheet, travelling at a rate of 115 feet per minute, was wrapped around the 3-foot diameter upper roll for 240 degrees of the circumference after the nip between the rolls and then was passed over cooling cans to a wind-up roll. After inspection and cutting, the product was packaged for sale as a floor covering. The product has a smooth vinyl film wear layer having an embossed design of a depth of approximately the thickness of the coating.

Any departure from the foregoing description which conforms to the present invention is intended to be included within the scope of the claims.

What is claimed is:
1. In the process for producing a decorative surface covering having a fused vinyl resinous composition wear layer with an embossed design extending into said wear layer by applying a coating at least 0.002 inch in thickness of a liquid, unfused resinous composition on one surface of a backing web to form said wear layer, heating to fuse the coating and embossing said design into the fused coating, the improvement which comprises utilizing as said coating composition a thixotropic liquid resinous composition and carrying out said embossing immediately prior to said heating.

2. The process of claim 1, wherein said coating has a thickness of about 0.002 inch to about 0.020 inch.

3. The process of claim 1, wherein said backing is a felted fibrous sheet impregnated with a resinous material to increase its tensile strength and resistance to moisture.

4. The process of claim 1, wherein a decoration is printed on the surface of said backing prior to the application of said liquid coating and said liquid coating is a transparent composition.

5. The process of claim 1, wherein said liquid resinous composition contains a blowing agent which decomposes during said heating to form a cellular foam structure.

6. The process of claim 1, wherein said backing web has a layer of gelled resinous composition containing a blowing agent and during said heating said blowing agent decomposes to form a cellular foam structure.

7. The process of claim 6 wherein said gelled resinous composition and said liquid coating composition are vinyl chloride polymer compositions.

8. The process of claim 1, wherein said liquid vinyl polymer composition is an organosol.

9. The process of claim 1, wherein the viscosity of said liquid composition is from about 4,000 centipoises to about 20,000 centipoises.

10. The process of claim 1, wherein the viscosity of said liquid composition is from about 6500 centipoises to about 10,000 centipoises.

11. The process of claim 1, wherein said liquid composition is fused by heating to a temperature of about 250° F. to about 375° F.

12. The process of claim 1, wherein said liquid composition is an organosol of vinyl chloride polymer and said coating is fused by heating to a temperature of about 275° F. to about 350° F.

References Cited by the Examiner
UNITED STATES PATENTS

| | | | |
|---|---|---|---|
| 1,352,163 | 9/1920 | Wilson | 117—10 |
| 2,681,866 | 6/1954 | Auchterlonie | 117—10 |
| 2,961,332 | 11/1960 | Nairn | 117—15 X |

WILLIAM D. MARTIN, *Primary Examiner.*

T. G. DAVIS, *Assistant Examiner.*